(12) United States Patent
Staples (10) Patent No.: US 6,975,236 B2
(45) Date of Patent: Dec. 13, 2005

(54) WIRELESS SOIL MOISTURE METER NETWORK

(75) Inventor: Peter Ethan Staples, Hermosa Beach, CA (US)

(73) Assignee: Blue Clover Design, LLC, Los Angeles, CA (US)

( * ) Notice: Subject to any disclaimer, the term of this patent is extended or adjusted under 35 U.S.C. 154(b) by 0 days.

(21) Appl. No.: 10/347,771

(22) Filed: Jan. 19, 2003

(65) Prior Publication Data

US 2004/0140902 A1 Jul. 22, 2004

(51) Int. Cl.[7] ............................................. G08B 21/00
(52) U.S. Cl. .................. 340/602; 340/870.01; 73/1.73
(58) Field of Search ............................ 340/602–604, 340/584, 618, 620, 539.16, 870.06, 870.01, 612, 539.17, 870.11, 870.16, 870.17; 73/73, 1.31, 1.73

(56) References Cited

U.S. PATENT DOCUMENTS

| 3,224,676 A | * | 12/1965 | Rauchwerger ............. 137/78.2 |
| 3,732,435 A | | 5/1973 | Strandberg, Jr. et al. |
| 4,069,716 A | * | 1/1978 | Vanasco et al. ............ 73/432.1 |
| 4,396,149 A | * | 8/1983 | Hirsch ......................... 239/63 |
| 4,531,087 A | | 7/1985 | Larson |
| 4,588,943 A | | 5/1986 | Hirth |
| 4,892,113 A | | 1/1990 | Fattahi |
| 5,031,358 A | * | 7/1991 | Sussman .................. 47/58.1 R |
| 5,117,359 A | * | 5/1992 | Eccles ........................... 702/3 |
| 5,179,347 A | | 1/1993 | Hawkins |
| 5,621,669 A | | 4/1997 | Bjornsson |
| 6,292,096 B1 | * | 9/2001 | Munch et al. .............. 340/445 |
| 6,340,892 B1 | | 1/2002 | Rynhart et al. |
| 6,343,255 B1 | * | 1/2002 | Peek et al. ..................... 702/3 |
| 2001/0045892 A1 | * | 11/2001 | Thomas et al. ............ 340/539 |

\* cited by examiner

*Primary Examiner*—Jeffery Hofsass
*Assistant Examiner*—Eric Blount
(74) *Attorney, Agent, or Firm*—Jeffrey Schox (57) ABSTRACT

A wireless soil moisture meter network includes a central display unit and a plurality of remote sensor units. Each sensor unit uses a probe to measure moisture content in soil, and uses a wireless transmitter to transmit the measurement through a wireless channel to the central display unit. The central display unit receives and displays the measurement in a format selectable by a user. The user may add to or remove from the network a sensor unit using a user interface of the central display unit.

17 Claims, 6 Drawing Sheets

WIRELESS SOIL MOISTURE METER NETWORK

BACKGROUND

Moisture meters exist today in various forms. There are complex moisture meters used by agriculture and gardening professionals as part of a larger weather monitoring or irrigation system. In the case of weather monitoring systems, they generally are used to record soil moisture along with a collection of other weather related data to detect trends to aid in making decisions affecting crop yield. Moisture meters are sometimes part of largescale irrigation systems used with golf courses or other large properties for the purpose of water management. These large systems are sometimes moveable, but still too large and expensive to be suitable for household use.

Handheld moisture meters, which are suitable for household use, exist as well, however, these are standalone devices without the ability to be networked to a common display unit. This limits their functionality since the user must be in the same physical location as the soil to be measured. Moreover, if there are multiple locations, with different soil types or different watering patterns, the user must go to each location to take the moisture reading.

Most recreational gardeners employ an "appearance and feel" technique to determine if their plants require watering. In other words, they visually examine the soil and feel it to see whether or not it is damp. This technique is used because is it simple and does not require special equipment. The disadvantages are that it is time-consuming and requires specialized knowledge in order to obtain an accurate reading. It is also difficult to estimate the moisture level at soil substantially below the surface.

The invention consists of portable handheld sensors wirelessly networked to a common display unit. This makes it possible for the user to observe the moisture level of the soil in multiple locations from a single conveniently positioned display unit.

The goal is to keep the soil moisture below the saturation level and above the permanent wilting point. This window is referred to as the management allowed depletion (MAD) zone. Saturated soil lacks the necessary oxygen and dry soil causes plant stress. Soil kept within the MAD zone, however, is a good environment for healthy plants.

SUMMARY

In one aspect, the invention relates to a wireless soil moisture meter network. The wireless network includes a plurality of handheld sensor units and a portable central display unit. Each of the handheld sensor units includes a sensing probe to measure moisture content in soil, and a wireless transmitter to transmit the measurement through a wireless channel. The portable central display unit receives and displays the measurement from the sensor units.

Embodiments of the above aspect of the invention may include one or more of the following features. The sensing probe includes a tube filled with a porous material, e.g., gypsum. Each of the sensor units also includes a synch button which, when pressed, enables the transmitter to send a bit sequence indicating the presence of the sensor unit. Each of the sensor units may also include a temperature sensor to measure soil temperature.

The central display unit may include a channel selector. The central display unit may also include a mode selector, which may be used to select a first, second, third, fourth, fifth, or sixth mode. The first mode toggles between display of a single sensor unit's measurement and simultaneous display of measurements from multiple sensor units. The second mode toggles between a numerical value and a non-numerical descriptor describing a moisture level. The third mode permits a sensor unit to be added to the wireless network. The fourth mode permits a sensor unit to be deleted from the wireless network. The fifth mode causes all of the sensor units to be deleted from the wireless network. The sixth mode causes an alarm to sound when the measured moisture content is below a predetermined threshold.

In another aspect, the invention relates to a method of establishing a wireless soil moisture meter network. The method comprises (a) using a portable central display unit to assign a wireless channel number to a remote sensor; (b) placing the central display unit in a wait state until a predefined bit sequence is received; and (c) enabling the sensor to send the predefined bit sequence and a unique identifier of the sensor to the central display unit.

Embodiments of the above aspect of the invention may include one or more of the following features. The method may include repeating the steps of (a), (b), and (c) to add additional remote sensors to the network. The method may also include storing the identifier at the central display unit for the assigned channel number. The central display unit may be set to an ADD mode before the wireless channel number is assigned. The wireless channel number may be assigned using a channel button of the central display unit. The central display unit enters the wait state when a synch option is selected at the central display unit. The predefined bit sequence may be sent when a synch button is activated at the remote sensor.

Embodiments may have one or more of the following advantages. The sensor units and the central display unit are all portable, making the network quick and easy to set up. Once established, the network provides a convenient way to monitor the moisture level of the soil in various locations. The low cost of the network makes it suitable for household use. It is simple to add more sensors to the network, so the network can be scaled up to accommodate lawns, gardens, and potted plants of various sizes.

DETAILED DESCRIPTION

Figure 1:
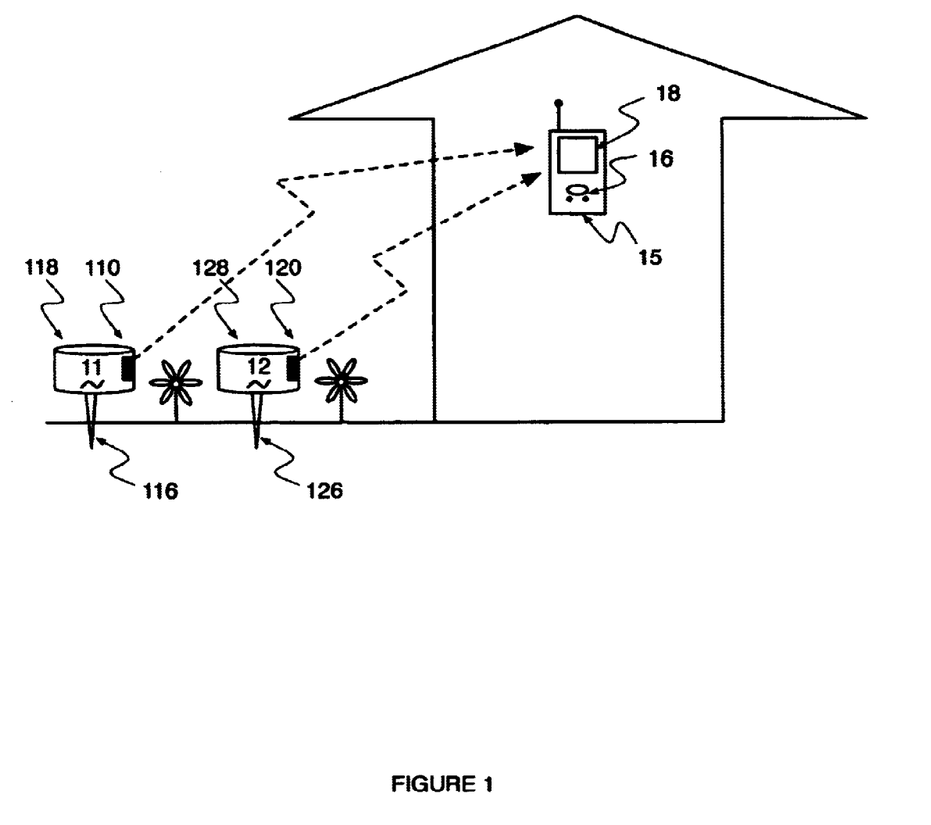
FIG. 1 shows an example of a wireless soil moisture meter network.

FIG. 1 shows a wireless soil moisture meter network 10 including a plurality of remote sensor units (RSU) 11 and 12, and a central display unit (CDU) 15. Each of the RSUs includes a probe 116 or 126 that is placed in the soil to read the moisture content, a converter unit 118 or 128 to convert the sensor reading into a digital value, and a wireless transmitter 110 or 120 that sends signals representing the digital value to the CDU 15. The CDU 15 receives the signals from the plurality of RSUs 11 and 12 and displays the readings on an LCD screen 18. The CDU 15 also includes a user interface 16 that allows the user to select the format of the readings.

Figure 2:
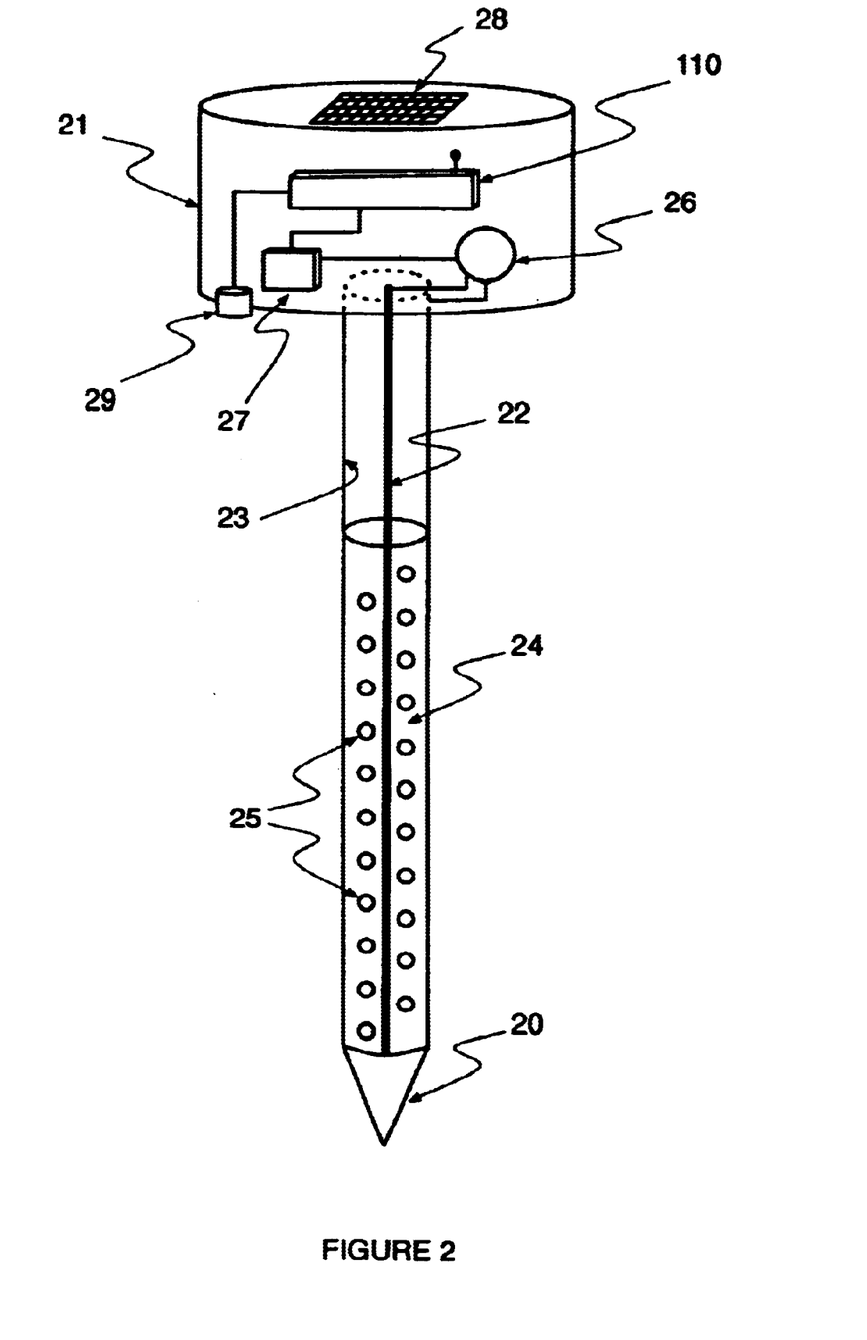
FIG. 2 shows a remote sensor unit (RSU) in the network.

FIG. 2 shows an embodiment of the RSU 11. The RSU 11 is handheld and highly portable so that the RSU can be easily relocated. The RSU 11 is suitable for indoor or outdoor use. The RSU 11 has a plastic casing 21. The plastic casing 21 of RSUs intended for outdoor use is weatherproof and includes a rubber seal. The plastic casing 21 prevents water and dust from interfering with the interior electronics. The RSU 11 has its own power source, which may be a battery housed inside the plastic casing 21 or a solar array 28 affixed to the top of the RSU.

The probe 116 of the RSU 11 includes a metal rod 22 enclosed by a non-corrodible metal tube 23, e.g., stainless steel or aluminum. Inside the tube 23 is a porous material 24 such as gypsum. Numerous holes 25 are drilled into the tube 23 so that moisture may pass through the holes between the gypsum 24 and the soil to be measured. The user may leave the RSU 11 in contact with the soil. However, the user may replace the RSU 11 approximately every two years since the porous material 24 inside the tube 23 dissolves over time.

The tube 23 is inserted into the soil within the root zone of interest. Water in the soil naturally moves in and out of the gypsum 24, depending on the level of soil moisture. The fluctuating moisture level in the gypsum 24 cause changes in the gypsum's electrical characteristics including conductivity. Higher moisture levels cause an increase in the conductivity. These conductivity changes are then measured with a voltmeter 26 to produce an analog voltage measurement.

When a measurement is taken, a fixed amount of current is sent through the metal rod 22. Then the voltage between the rod 22 and the tube 23 is measured with voltmeter 26. This voltage divided by the current represents the resistance of the gypsum 24. The resistance level indicates the moisture content in the gypsum 24.

In an alternative embodiment, the probe 116 may include two metallic rods enclosed by a nonmetallic tube. The rods may take the form of two traces etched into a circuit board. Operation is similar to the embodiment in FIG. 2 except that the voltmeter 26 is connected to the two rods to measure the resistance between them.

The voltage measured in the probe 116 is applied to an analog to digital converter (ADC) 27 to produce a digital data stream. The ADC 27 may be a specialized component, a 555 timer circuit, or a microcontroller with an analog input. In the case of a 555 timer circuit, the timer circuit generates a stream of square wave pulses. The duration of each pulse is a function of the voltage applied to the circuit. The varying duration of the pulses is interpreted in the RSU 11 or by a microcontroller in the CDU 15.

The RSU 11 generally takes measurements on a relatively infrequent basis (e.g., every half hour) to conserve power. The frequency of the measurements may be a fixed frequency or may be set by the user. Each new measurement may be triggered by either a digital timer or a slowly draining capacitor in the RSU 11.

The RSU 11 may also possess the ability to measure the temperature of the soil. A thermistor or a solid-state temperature sensor may be embedded in a plastic tip 20 of the probe 116. In the case of the thermistor, the voltmeter 26 may be used to measure the thermistor's resistance, which varies with temperature. This resistance measurement is sent to the ADC 27 where a digital temperature value is produced. Alternatively, the solid-state temperature sensor produces a digital temperature value directly. In both cases, the digital temperature value is combined with the moisture measurement and sent to the transmitter 110 for transmission to the CDU 15.

Before sending the digital data stream to the CDU 15, the wireless transmitter 110 modulates the carrier frequency with the data stream. The data stream consists of a header (a sequence of bits preprogrammed in the RSU 11 and CDU 15), a sensor ID code, and a most recent moisture measurement. Since the transmissions are short in duration relative to the frequency of the measurements, all of the RSUs 11 and 12 use the same frequency. This is effectively a time-division multiple access system, but the RSUs 11 and 12 themselves are not synchronized. The RSUs 11 and 12 simply transmit whenever a new reading is taken. In the case of a digital timer, a randomizer may be employed to slightly delay the transmission to reduce the chance of two RSUs repeatedly transmitting at the same time.

The user may use a synch button 29 on the RSU 11 to override the normal transmission cycle for the purpose of testing or adding a new RSU to the network 10. When the synch button 29 is pressed, the transmitter 110 immediately sends a special bit sequence indicating the presence of the new sensor as well as the sensor's unique ID. For testing, the RSU 11 also takes a moisture measurement upon pressing the synch button 29 and sends the measurement to the CDU 15.

Figure 3:
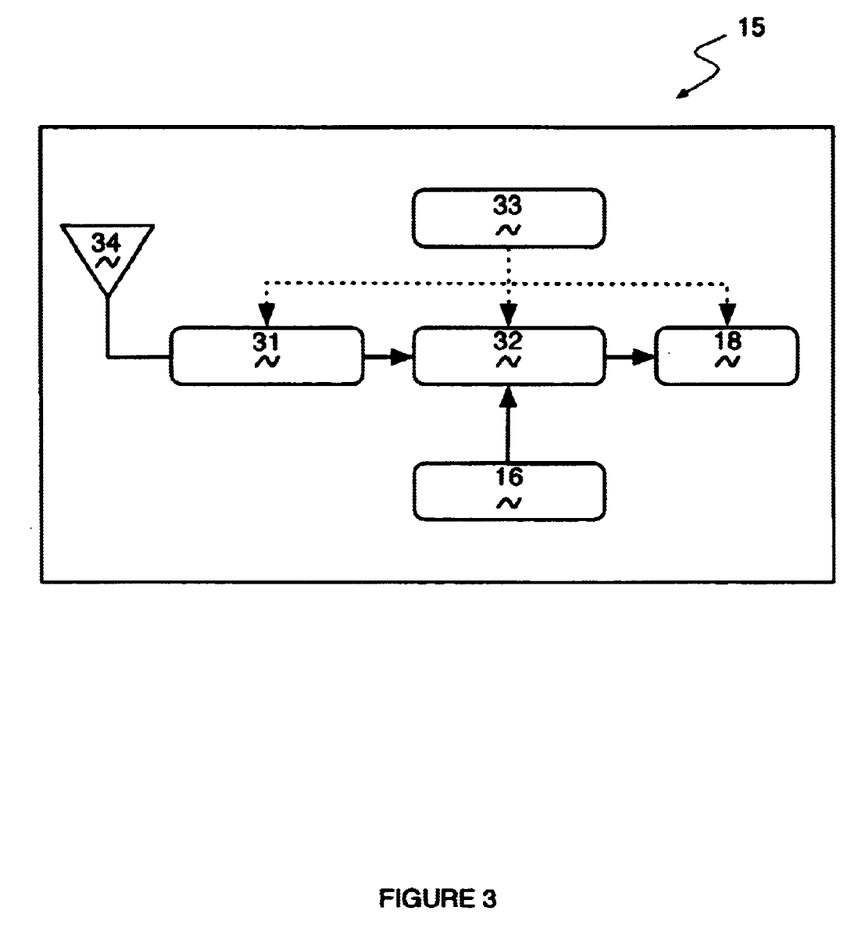
FIG. 3 shows a central display unit (CDU) in the network.

FIG. 3 shows an embodiment of the CDU 15. The CDU 15 is a separate unit that receives the measurements from the RSUs 11 and 12 through an antenna 34 and displays the readings from the RSUs on the LCD screen 18. The CDU 15 is approximately 4"×6"×0.25" and is therefore very portable. The CDU 15 is powered by a power source 33, which may be batteries replaceable by the user. When the power is low, a "low battery" indicator appears on the LCD screen 18. The CDU 15 can also be used to verify proper installation of the RSUs 11 and 12. Immediately after adding a RSU to the network 10 and inserting the RSU into the soil, the user may press the synch button 29 on the RSU and observe the measurement on the LCD screen 18 to verify proper installation. The CDU 15 also includes a receiver 31, a microcontroller (MCU) 32, and the user interface 16. The receiver 31 and MCU 32 may be implemented on separate integrated circuits.

Figure 4:
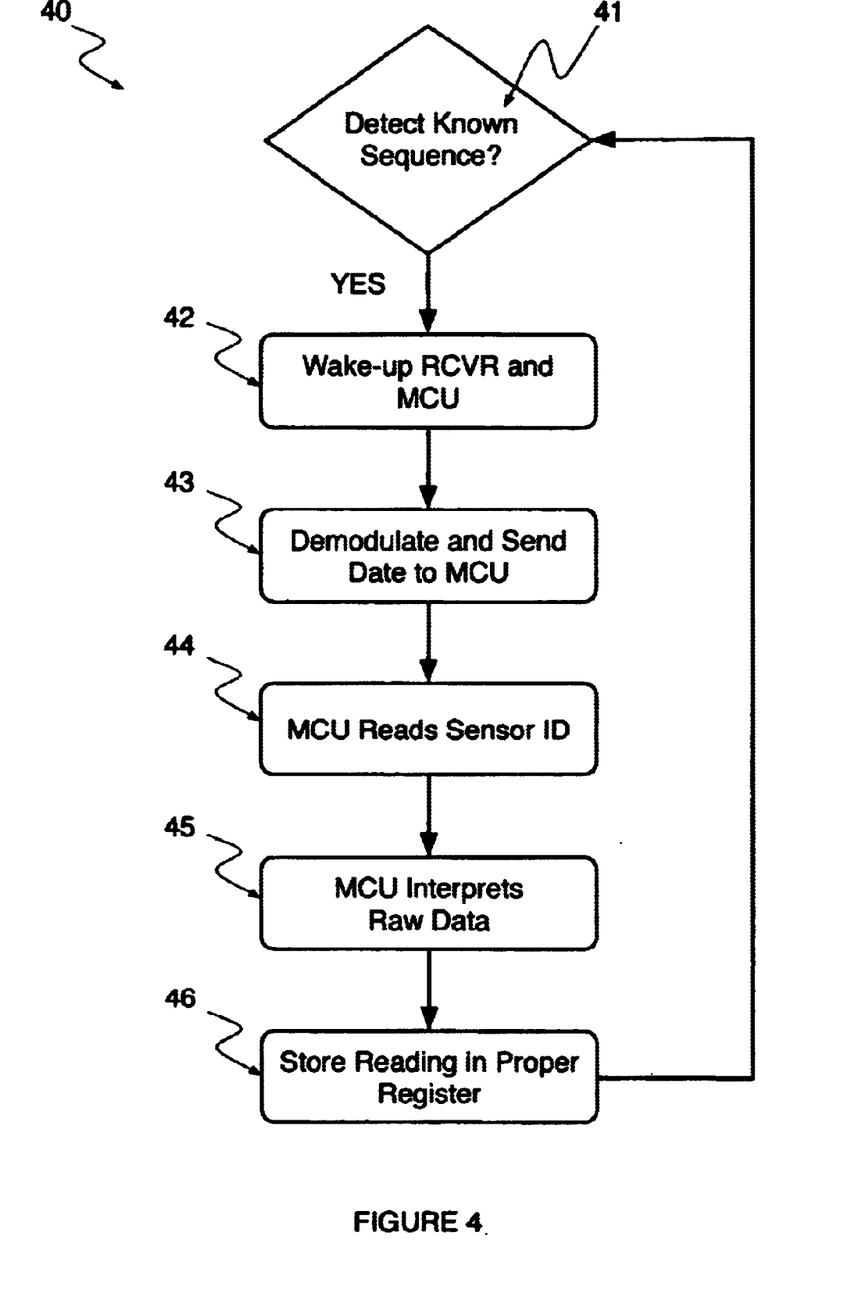
FIG. 4 illustrates a process of the CDU for reading the measurements from the RSUs.

FIG. 4 illustrates a process 40 of the receiver 31 and the MCU 32 for reading the measurements from the RSUs. The MCU 32 is initially in a sleep mode. When the receiver 31 detects a known bit sequence (box 41), the receiver wakes up the MCU 32 (box 42). The receiver 31 does not distinguish between the various RSUs, instead the receiver demodulates the incoming signal and passes the resulting data stream to the MCU 32 (box 43).

The MCU 32 compares the data stream from the receiver 31 against the IDs of the various RSUs stored in registers inside the MCU 32 (box 44). When the incoming data stream matches one of the IDs, the pulse pattern that follows is stored for processing. The pulse stream is compared against a lookup table to determine the corresponding moisture reading (box 45). The moisture reading is then stored as the latest value in the register for the channel corresponding to that RSU (box 46). The values from all the RSUs are stored within the CDU 15 so that any channel may be examined by the user at any time.

The user may view the moisture measurements on the LDC screen 18. In the example shown in FIG. 5, at the top of the screen 18 is a label 51 indicating the mode that the CDU 15 is currently in. The CDU 15 may be set to one of the modes: ALL (display all), NUM (numerical display), ADD (and a channel), DEL (delete a channel), CLR (clear all channels), and BUZ (activate the alarm). On the left side of the screen 18 is a channel label 52 indicating the channel to which an RSU is assigned. To the right of the channel label 52 is the latest measurement 53 from the RSU corresponding to that particular channel. At the bottom of the screen is a message line 54 that helps the user understand the various modes of the CDU 15.

Figure 5:
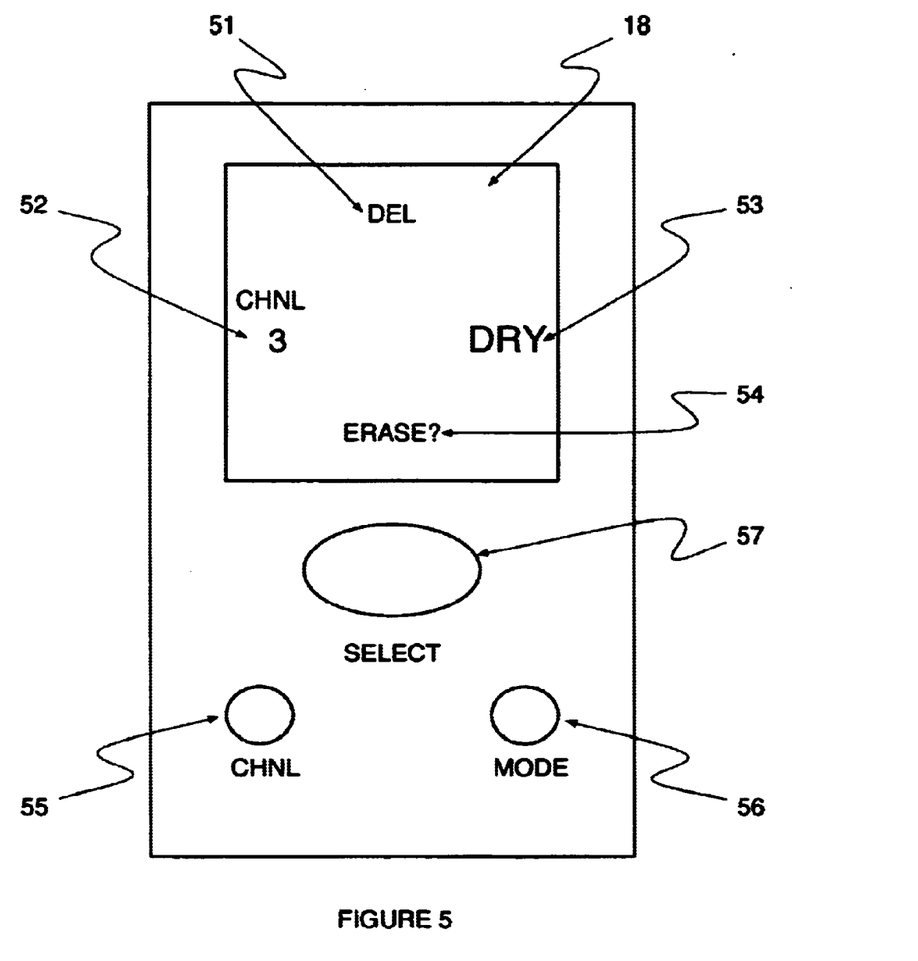
FIG. 5 shows a Liquid Crystal Display (LCD) and a user interface of the CDU.

In FIG. 5, the user interface 16 consists of three buttons. One button is a CHANNEL button 55. Pressing the CHANNEL button 55 allows the user to cycle through the various channels to observe the reading from the desired RSU. The second button is a MODE button 56. By pressing this button 56, the user can cycle through the six modes of the CDU 15. The third button is a SELECT button 57, which is used to choose options within each of the CDU modes.

One of the CDU modes is the ALL (display all) mode, which allows the user to view the moisture measurements on multiple channels simultaneously. In one possible implementation, nine channels may be displayed on the LCD screen 18 at the same time. In the event that there are more than nine channels, the measurements may be shown in groups of nine. The CHANNEL button 55 may be used to cycle through the various groups. The mode is activated by pressing the MODE button 56 until the word "ALL" is displayed at the top of screen 18. The message line 54 will say "ONE/ALL". When the user presses the SELECT button 57, all or a group of the active channels are displayed simultaneously and the message line 54 changes to "ONE/ALL". To return to the single channel format, the user presses the SELECT button 57 again.

The user may choose between numerical and non-numerical formats of the measurements displayed on the LCD screen 18. The non-numerical format may include icons describing moisture levels graphically. For example, the icon can be a glass containing a variable amount of water. The non-numerical format may include descriptors such as DRY, DRY+, REG, WET, or WET+. To select a particular display format, the user presses the MODE button 56 until the word "NUM" is displayed at the top of the screen 18. The message line 54 then says "WORD/NUM". When the user presses the SELECT button 57, the measurements are displayed in numerical form (e.g., a numerical scale from 1 to 10) instead of word form and the message line 54 changes to "WORD/NUM". To return to the non-numerical format, the user presses the SELECT button 57 again.

Figure 6:
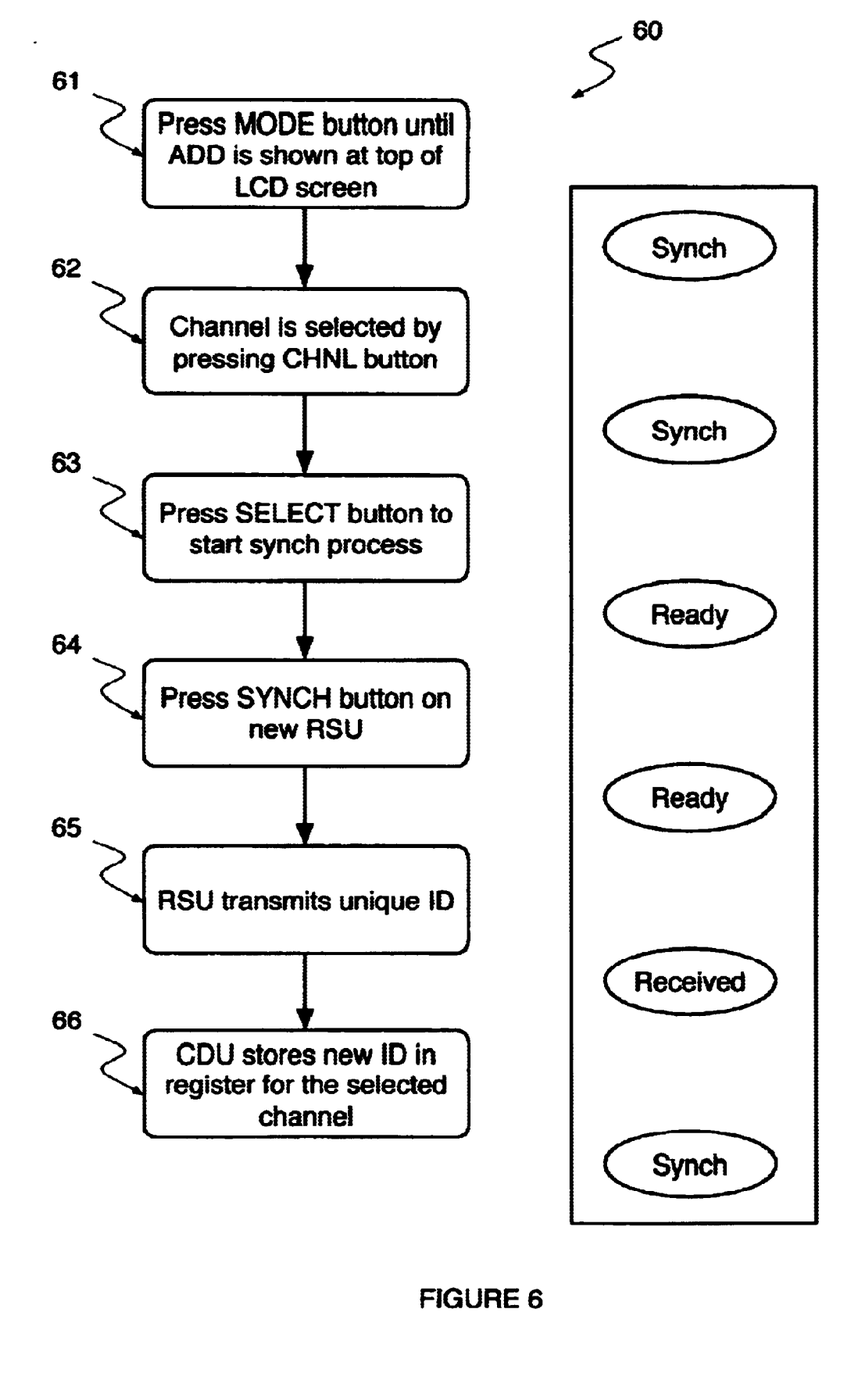
FIG. 6 shows a process of the CDU for adding a channel to the network.

As shown by an example in FIG. 6, the user may add a RSU to the network 10 by following a multi-step add procedure 60:

1. The user presses the mode button 56 until ADD is displayed at the top of the screen 18 (box 61).

2. The user selects the channel by pressing the channel button until the desired channel is shown on the left side of the screen 18 (box 62).

3. The message line displays the word "Synch" which prompts the user to press the SELECT button 57 to initiate a synch process. The CDU 15 is put into a WAIT state such that it is expecting a predefined bit pattern (indicating the presence of a new sensor) from a new RSU (box 63).

4. Then the user presses the synch button 29 on the new RSU (box 64). This causes the new RSU to transmit the predefined bit pattern as well as its unique ID to the CDU 15 (box 65).

5. The CDU 15 stores the new ID into a register corresponding to the selected channel. The message line indicates to the user that the new ID has been received and the sensor was added to the network (box 66).

The user may also delete a channel from the network 10 by following a multi-step delete procedure:

1. The user presses the MODE button 56 until DEL is displayed at the top of the screen 18.

2. The user presses the CHANNEL button 55 until the channel to be deleted is shown on the left side of the screen 18.

3. The user presses the SELECT button 57 to delete the channel shown. The message line 54 indicates the channel has been successfully deleted.

Rather than delete each channel individually, the user has the option of deleting all of the channels at the same time. The mode is activated by pressing the MODE button 56 until the word "CLR" is displayed at the top of the LCD screen 18. The message line 54 then says "Clear all?". When the user presses the SELECT button 57, all of the active channels are deleted and the message line 54 changes to "Done".

The user also has the option to activate an alarm to sound if one of the RSUs is reporting a low level of soil moisture. The alarm is triggered when the moisture reading is below a predefined threshold. In some scenarios, this threshold may be changed by the user. For example, the user may set a different threshold for different plant types. This mode is activated by pressing the MODE button 56 until the word "BUZ" is displayed at the top of the LCD screen 18. The message line 54 then says "Alarm ON/OFF". When the user presses the SELECT button 57, the alarm function is activated and the message line 54 changes to "Alarm ON/OFF". If any of the RSUs reports a "DRY+" measurement for a predefined extended period, the alarm sounds periodically until a REG, WET, or WET+reading is reported. A special alarm icon may also appear on the LCD screen 18 to warn the user of the dry soil condition.

Accordingly, other embodiments are within the scope of the following claims.

What is claimed is:

1. A method of establishing a wireless soil moisture meter network, the method comprising:
   (a) using a portable central display unit to assign a wireless channel number to a remote sensor;
   (b) upon the activation of a synch mode, placing the central display unit in a wait state until a predefined bit sequence is received; and
   (c) enabling the sensor to send the predefined bit sequence and a unique identifier of the sensor to the central display unit.

2. The method of claim 1 further comprising repeating the steps of (a), (b), and (c) to add additional remote sensors to the network.

3. The method of claim 1 further comprising storing the identifier at the central display unit for the assigned channel number.

4. The method of claim 1, wherein the central display unit is set to an ALL mode before the wireless channel number is assigned.

5. The method of claim 1, wherein the wireless channel number is assigned using a channel button of the central display unit.

6. The method of claim 1, wherein the predefined bit sequence and the unique identifier are sent when a synch button is activated at the remote sensor.

7. A method for establishing a network between a central display unit and an environmental sensor, comprising the steps of:
   (a) selecting a channel for the sensor;
   (b) activating a "wait" mode on the display unit;
   (c) transmitting a sensor identifier from the sensor to the display unit; and
   (d) storing the sensor identifier and corresponding channel in a memory device of the display unit.

8. The method of claim 7 wherein step (a) further includes: activating an "add channel" mode on the display unit.

9. A method for establishing a network between a central display unit, a first environmental sensor, and a second environmental sensor, comprising the steps of:
   (a) activating a "wait" state for the display unit and transmitting a predefined sequence and a first sensor ID from the first sensor to the display unit;

(b) upon receiving the predefined sequence and the first sensor ID, recording the presence of the first sensor in a memory device;

(c) activating a "wait" state for the display unit and transmitting the predefined sequence and a second sensor ID from the second sensor to the display unit; and (d) upon receiving the predefined sequence and the second sensor ID, recording the presence of the second sensor in the memory device.

10. The method of claim 9, wherein step (a) and step (c) further include: activating the "wait" state for the display unit upon the activation of an "add channel" mode on the display unit.

11. The method of claim 10, wherein step (a) further includes: allowing selection of a first channel for the first sensor, end wherein step (c) further includes: allowing selection of a second channel for the second sensor.

12. The method of claim 11, wherein step (b) further includes: recording the presence of the first sensor and the corresponding first channel selection in the memory device, and wherein step (d) further includes: recording the presence of the second sensor and the corresponding second channel selection in the memory device.

13. A wireless network comprising:

a first environmental sensor unit including a sensor adapted to measure an environmental condition, a transmitter adapted to transmit a data stream through a wireless channel, and a button adapted to cause the transmitter to transmit a predefined sequence and a first sensor ID upon activation;

a second environmental sensor unit including a sensor adapted to measure an environmental condition, a transmitter adapted to transmit a data stream through a wireless channel, and a button adapted to cause the transmitter to transmit the predefined sequence and a second sensor ID upon activation; and a central display unit including a receiver adapted to receive a data stream through a wireless channel, a memory device, and a processor having an "add channel" mode in which the processor is adapted to record the presence of the first environment sensor unit in the memory device upon the receipt of the predefined sequence and the first sensor ID and further adapted to record the presence of the second environment sensor unit in the memory device upon the receipt of the predefined sequence and the second sensor ID.

14. The wireless network of claim 13, wherein the sensors of the first environmental sensor unit and the second environment sensor unit are adapted to measure soil moisture levels.

15. The wireless network of claim 13, wherein the first environmental sensor unit and the second environmental sensor unit further include a controller adapted to cause the sensor to measure an environmental condition and to cause the transmitter to transmit the measurement.

16. The wireless network of claim 15, wherein the central display unit further includes a screen, and wherein the processor also has a "display" mode in which the processor is further adapted to display the measurement of a sensor on the screen.

17. The wireless network of claim 13, wherein the processor is further adapted to enter a "wait" state while in the "add channel" mode.

* * * * *

UNITED STATES PATENT AND TRADEMARK OFFICE
CERTIFICATE OF CORRECTION

PATENT NO. : 6,975,236 B2
DATED : December 13, 2005
INVENTOR(S) : Peter Ethan Staples It is certified that error appears in the above-identified patent and that said Letters Patent is hereby corrected as shown below:

Column 7,
Line 17, "end" should read -- and --.

Signed and Sealed this

Fourth Day of April, 2006

JON W. DUDAS
*Director of the United States Patent and Trademark Office*